Figure 1:
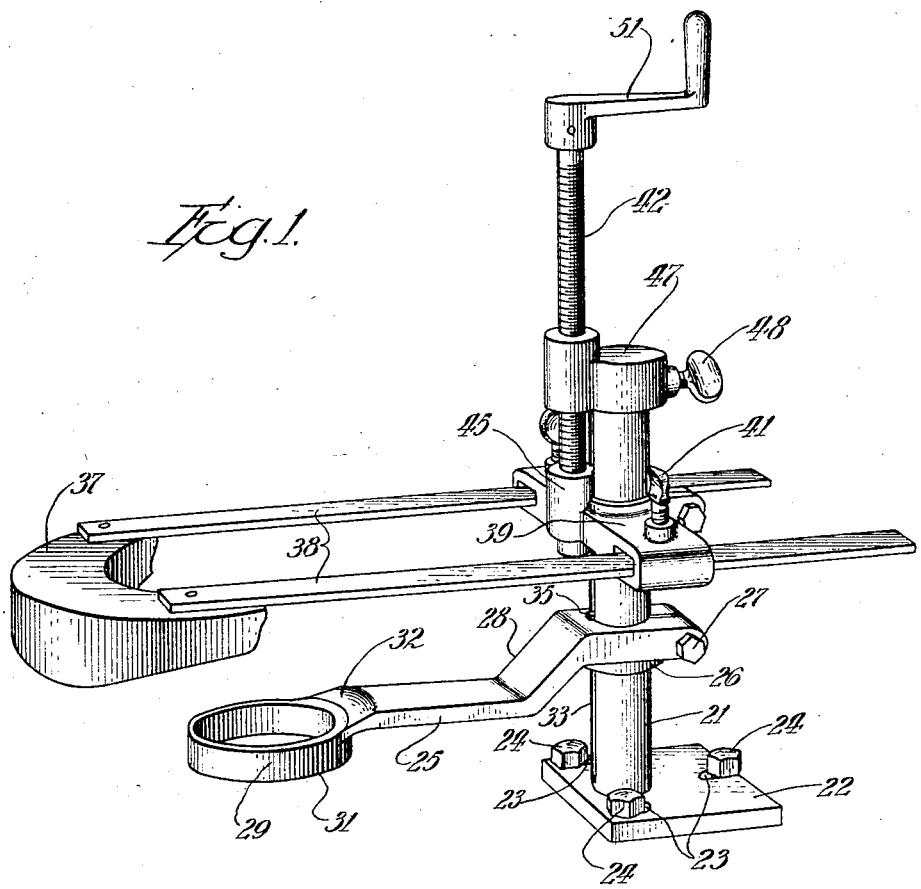

March 19, 1929.  W. L. HALL  1,706,156
ATTACHMENT FOR SHAPERS
Filed June 21, 1926  2 Sheets-Sheet 2

Inventor:
William L. Hall,
By: Carl S. Lloyd Atty.

Patented Mar. 19, 1929.

1,706,156

UNITED STATES PATENT OFFICE.

WILLIAM L. HALL, OF CHICAGO, ILLINOIS.

ATTACHMENT FOR SHAPERS.

Application filed June 21, 1926. Serial No. 117,279.

My invention relates to that type of wood working machine known as a shaper and has for its primary object the provision of an improvement upon the device shown and described in my co-pending application, Serial No. 718,351, filed June 6, 1924, which has to do with the apparatus associated with the cutters for guiding the stock during the operation of the machine.

Machines of this character operate at a very high rate of speed and their efficiency depends, to a high degree, upon exact relationship of the parts and the proper disposition of the work with respect to the cutters. The latter are ordinarily secured to a spindle extending vertically through an aperture in the shaper table, said cutters being held in place by means of spaced grooved collars, removably mounted on the spindle and adapted to be clamped upon the knives and to rotate with the spindle. In accordance with the invention of my co-pending application above referred to, I provide a dead work guide arranged in particularly advantageous relationship with respect to the cutters and securing collars. In view of the particular desirability for nicety of adjustment and exactness of relationship of the parts in such a machine, I have devised means whereby an exceptional degree of accuracy may be attained with unusual facility and the present invention resides, in part, in the instrumentalities whereby such results are rendered possible.

A further object of the invention is the provision of a guide member having the advantages of that element in my co-pending application (including the possibility of arranging the guide ring either above or below the cutters) and being formed to more advantageously relate said guide ring to the cutters and to the table when the ring is disposed beneath the cutters, ample clearance being provided even though the cutters are disposed at but slight elevation above the table.

Another object of the invention is the provision of a hold-down device in conjunction with the guiding means above referred to, this device being mounted upon a post forming a part of the guide mechanism and being so related thereto as to be readily adjusted to any selected vertical position as the form and position of the work may require.

Other objects and advantages of the invention will be apparent as it is better understood from the following description, which, taken in connection with the accompanying drawings, discloses a preferred embodiment thereof.

Figure 2:
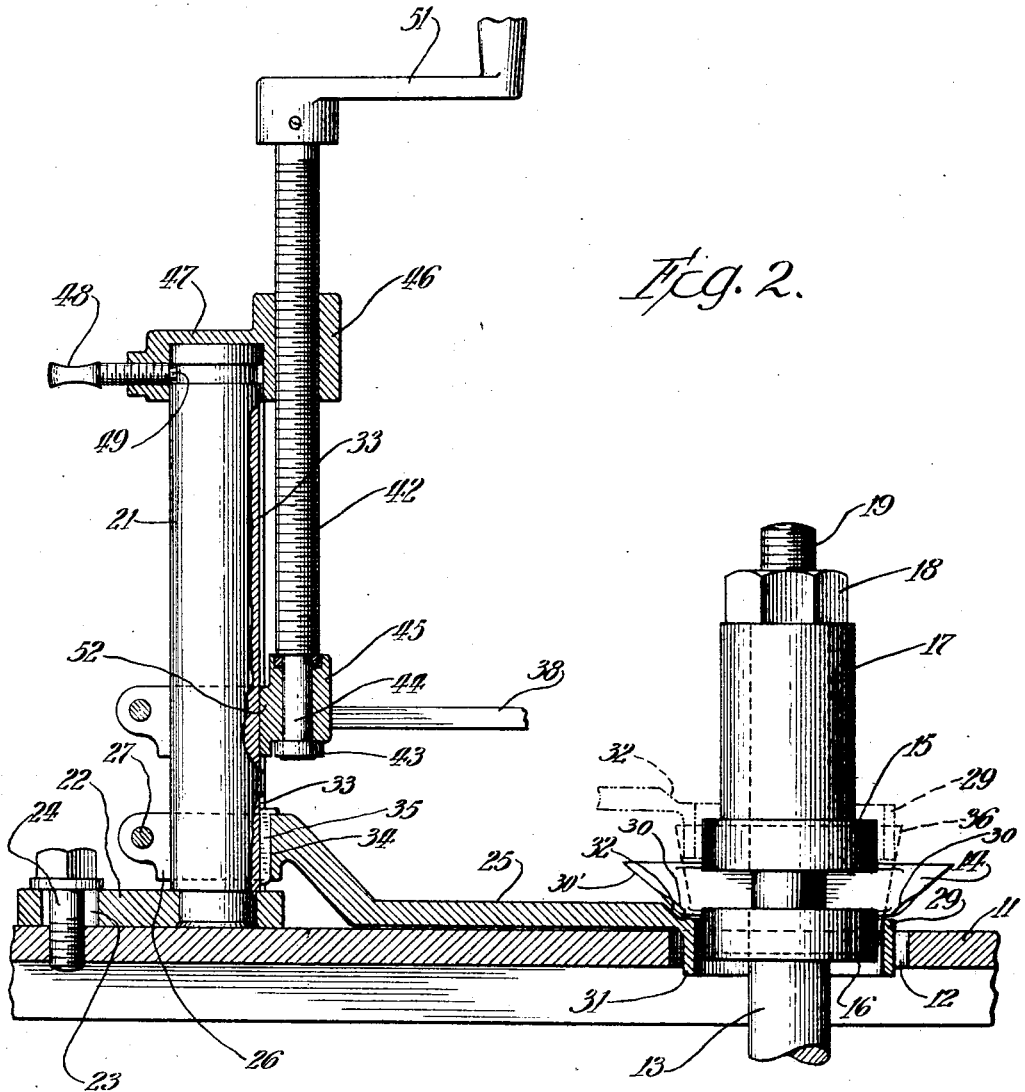

Referring to the drawings,

Figure 1 is a perspective view of an apparatus in which my invention is embodied; and Fig. 2 is a sectional and elevational view thereof, certain parts being broken away for convenience in illustration and the adjusted position of certain of the elements being indicated in dotted lines.

Upon said drawings, illustrating the best manner in which I have thus far contemplated applying the principles of the invention, the reference character 11 indicates the shaper table, which is apertured, as indicated at 12, to permit the protrusion therethrough of a cutter spindle 13, carrying knives or cutters 14, which are held in place between grooved collars 15 and 16 adapted to be removably secured to the spindle 13 by means of a superimposed collar 17 and nut 18 threaded upon the upper end 19 of said spindle.

A post 21 is rigidly secured to a base 22, which is slotted, as indicated at 23, and adapted to be secured to the table 11 in properly adjusted position by means of screw bolts 24. An arm 25 is adapted to be carried by said post and comprises a split collar portion 26, adapted to be clamped upon the post in desired adjusted position by means of a screw 27, said collar portion being offset, as indicated at 28, and the body portion 25 of the arm terminating in an offset ring 29, which is formed with a depending flange 31, the arm 25 being cut back, as indicated at 32, to provide ample clearance for the knives and permit the arrangement thereof at but slight elevation above the table, even though the ring be disposed beneath said knives. The knives are ordinarily provided with a heel, as indicated at 30, and are inclined upwardly and outwardly, as shown at 30', the contour of the arm at 32 being such as to provide clearance for this form of knife when the heel 30 is arranged above the top of the ring 29. The post 21 is provided with a vertical groove 33 and the interior of the collar or hub portion 26 of the arm 25 is provided with a groove 34, adapted to be arranged parallel to the groove 33, said grooves when in registration being adapted to receive a key 35, whereby the arm is locked against rotary movement upon the post.

It is to be understood that the guide members are adapted to be provided in a variety of sizes, depending upon the size of the slotted collars 15, 16 associated with the cutters, and the aperture 12 is sufficiently large to receive the largest size ring 29 which may be required, it being obviously an easy matter to remove and replace a guide member when occasion requires, inasmuch as the parts carried by the post 21 are all removable and the hub part 26 of the arm, when lowered, may be slipped off of said post. Furthermore, said collars 15, 16 may vary correspondingly in size and it is desirable that a predetermined and relatively small clearance be provided between the interior of the ring 29 and the exterior of the collar. For the purpose of centering said ring 29 with respect to the spindle 13, I provide a conical member 36 (of size appropriate to the particular ring with which it is to be used), this member being adapted to be arranged upon the spindle prior to the positioning of the cutters and securing collars and preferably being of substantial weight so that when it slides down upon said spindle and enters the collar 29, the latter is moved to proper relation to the spindle, it being understood that inasmuch as the base 22 at this time is not fastened to the table, the latter may move in such manner as to permit proper centering of the ring 29. Prior to removal of the conical member 36, said post is adapted to be clamped down by means of the screw bolts 24, it being understood that the collar or hub 26 has previously been tightly clamped upon the post 21 by means of the screw 27. The conical member 36 may then be removed and the cutters and associated collars positioned, as shown in Fig. 2. In the event that it is desired to have the guide ring disposed above the cutters, this may be accomplished by clamping said arm onto the post 21 so that said ring is disposed in the position shown in dotted lines in said Fig. 2.

For the purpose of holding the work down to the table and protecting the operator from the cutters, I provide a hold-down device comprising an arcuate wooden member 37, carried by parallel bars 38 projecting from a bracket 39 in which said bars are horizontally adjustable, being adapted to be clamped in desired position by wing nuts 41. Said bracket 39 is carried at the lower end of a screw 42, to which it is secured by means of a collar 43 secured to a reduced portion 44 of said screw member, said reduced portion being rotatable within a hub 45 on the bracket 39. Said screw is operable within an interiorly threaded hub portion 46 of a cap member 47 adapted to be positioned upon the top of the post 21 and secured thereto by means of a wing nut 48, the inner end of which extends into a groove 49 in said post. The upper end of said screw is provided with a crank handle 51 and it will be apparent that rotation of said handle will move the bracket 39 and the hold-down mechanism secured thereto relatively to the cap member 47 and vertically of the post 21, thereby accommodating stock of different thickness. The fact that the hold-down mechanism is readily removable from the post 21 is an advantage of considerable importance, since it may be desirable to remove it quickly in case of an accident or in case that quick positioning or removal of the stock is desirable. The hub portion of the bracket 45 is provided with an inner guide portion 52 adapted to be disposed within the groove 33 whereby said bracket is held against rotation upon said post.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination with a shaper, including a table, a cutter spindle and cutters carried thereby, of a work guide, comprising an arm terminating in a guide ring arrangeable about said spindle and adjacent the cutters, a post upon which said arm is mounted for vertical adjustment, means for adjustably securing said post to the table, and means for centering said ring relative to said spindle prior to permanent attachment of the post to the table whereby said post and associated parts may be caused to assume accurately adjusted position to properly space said guide ring with respect to the spindle.

2. The combination with a shaper, including a table, a cutter spindle and cutters carried thereby, of a work guide, comprising an arm terminating in a guide ring arrangeable about said spindle and adjacent the cutters, a post upon which said arm is mounted for vertical adjustment, means for adjustably securing said post to the table, and means for centering said ring relative to said spindle prior to permanent attachment of the post to the table whereby said post and associated parts may be caused to assume accurately adjusted position to properly space said guide ring with respect to the spindle, said centering means comprising a conical member arrangeable upon said spindle and slidable thereon, said member being adapted to enter said ring and being removable therefrom after the same has been secured in properly centered relation.

3. The combination with a shaper, including a table, a cutter spindle and cutters carried thereby, of a work guide, comprising an arm terminating in a guide ring arrangeable about said spindle and adjacent the cutters, a post upon which said arm is mounted for vertical adjustment, means for adjustably securing said post to the table, and means for centering said ring relative to said spindle prior to permanent attachment of the post to the table whereby said post and associated parts may be caused to assume accurately adjusted position to properly space said guide ring with respect to the spindle, said centering means comprising a conical member arrangeable upon said spindle and slidable thereon, said member being adapted to enter said ring and being removable therefrom after the same has been secured in properly centered relation, said member being of substantial weight whereby descent thereof by gravity on said spindle will arrange said ring and associated parts in desired position.

4. The combination with a shaper, including a table, a cutter spindle and cutters carried thereby, of a work guide, comprising an arm terminating in a guide ring arrangeable about said spindle and adjacent the cutters, a post upon which said arm is mounted for vertical adjustment, means for adjustably securing said post to the table, and means for centering said ring relative to said spindle prior to permanent attachment of the post to the table whereby said post and associated parts may be caused to assume accurately adjusted position to properly space said guide ring with respect to the spindle, said centering means comprising a conical member arrangeable upon said spindle and slidable thereon, said member being adapted to enter said ring and being removable therefrom after the same has been secured in properly centered relation, said arm having an integral split collar arrangeable upon said post and the said collar and post having registering key-ways for receiving a key, whereby the arm may be held against rotary movement on the post.

5. The combination with a shaper, including a table, a cutter spindle and cutters carried thereby, of a work guide, comprising an arm having an integral guide ring offset from the plane of the arm, the arm being cut back adjacent said ring to provide clearance for the cutters, a post to which said arm is attached for vertical adjustment whereby said guide ring may be arranged either above or below the cutters, and means for securing said post to the table, said table having an aperture through which said spindle is adapted to extend and said guide ring being arrangeable in said aperture with the top thereof protruding but slightly above the top of the table.

6. The combination with a shaper, including a table, a cutter spindle and cutters carried thereby, of a work guide, comprising an arm having an integral guide ring offset from the plane of the arm, the arm being cut back adjacent said ring to provide clearance for the cutters, a post to which said arm is attached for vertical adjustment whereby said guide ring may be arranged either above or below the cutters, and means for securing said post to the table, said table having an aperture through which said spindle is adapted to extend and said guide ring being arrangeable in said aperture with the top thereof protruding but slightly above the top of the table and disposed below the plane of the arm, the latter having a body portion arranged close to the top of the table and an offset portion attachable to said post.

7. The combination with a shaper, including a table, a cutter spindle and cutters carried thereby, of a post protruding upwardly from said table, an arm attachable to said post and vertically adjustable thereon, said arm having an integral work guiding ring arrangeable about said spindle adjacent said cutters, a hold-down device mounted upon said post and including a vertically adjustable bracket, said device being independent of said arm and means carried by said bracket and projecting therefrom and adapted to hold the work in proper position and protect the operator from the cutters.

8. The combination with a shaper, including a table, a cutter spindle and cutters carried thereby, of a post protruding upwardly from said table, an arm attachable to said post and vertically adjustable thereon, said arm having an integral work guiding ring arrangeable about said spindle adjacent said cutters, a hold-down device mounted upon said post and including a cap member arrangeable upon said post and adapted to be fixed thereto, said member having a projecting apertured portion interiorly threaded, a bracket slidably mounted on said post, work-holding means carried by said bracket and projecting therefrom, said means being adapted to hold the work in proper position and protect the operator from the cutters, and a hand screw extending through said threaded portion of the cap member, and secured to said bracket whereby the latter may be moved relatively to said cap member and adjusted to desired position upon the post.

9. The combination with a shaper, including a table, a cutter spindle and cutters carried thereby, of a post protruding upwardly from said table, an arm attachable to said post and vertically adjustable thereon, said arm having an integral work guiding ring arrangeable about said spindle adjacent said cutters, a hold-down device mounted upon said post and including a cap member arrangeable upon said post and adapted to be fixed thereto, said member having a projecting apertured portion interiorly threaded, a bracket slidably mounted on said post, a work-holding means carried by said bracket and projecting therefrom, said means being adapted to hold the work in proper position and protect the operator from the cutters, and a hand screw extending through said threaded portion of the cap member and secured to said bracket whereby the latter may be moved relatively to said cap member and adjusted to desired position upon the post, said bracket being secured against rotary movement on said post.

10. The combination with a shaper, including a table, a cutter spindle and cutters carried thereby, of a post protruding upwardly from said table, an arm attachable to said post and vertically adjustable thereon, said arm having an integral work guiding ring arrangeable about said spindle adjacent said cutters, a hold-down device mounted upon said post and including a cap member arrangeable upon said post and adapted to be fixed thereto, said member having a projecting apertured portion interiorly threaded, a bracket slidably mounted on said post, work-holding means carried by said bracket and projecting therefrom, said means being adapted to hold the work in proper position and protect the operator from the cutters, and a hand screw extending through said threaded portion of the cap member and secured to said bracket whereby the latter may be moved relatively to said cap member and adjusted to desired position upon the post, said cap member being removable from said post.

11. The combination with a shaper, including a table, a cutter spindle and cutters carried thereby, of a post protruding upwardly from said table, an arm attachable to said post and vertically adjustable thereon, said arm having an integral work guiding ring arrangeable about said spindle adjacent said cutters, a hold-down device mounted upon said post and including a member adapted to be fixed to said post, said member having a projecting apertured portion interiorly threaded, a bracket slidably mounted on said post, work-holding means carried by said bracket and projecting therefrom, said means being adapted to hold the work in proper position and protect the operator from the cutters, and a hand screw extending through said threaded portion of the member and secured to said bracket whereby the latter may be moved relatively to said member and adjusted to desired position upon the post.

In witness whereof, I hereunto subscribe my name to this specification.

WILLIAM L. HALL.